A. P. TONON.
AUTOMOBILE.
APPLICATION FILED NOV. 13, 1916.
1,239,643.
Patented Sept. 11, 1917.
2 SHEETS—SHEET 1.
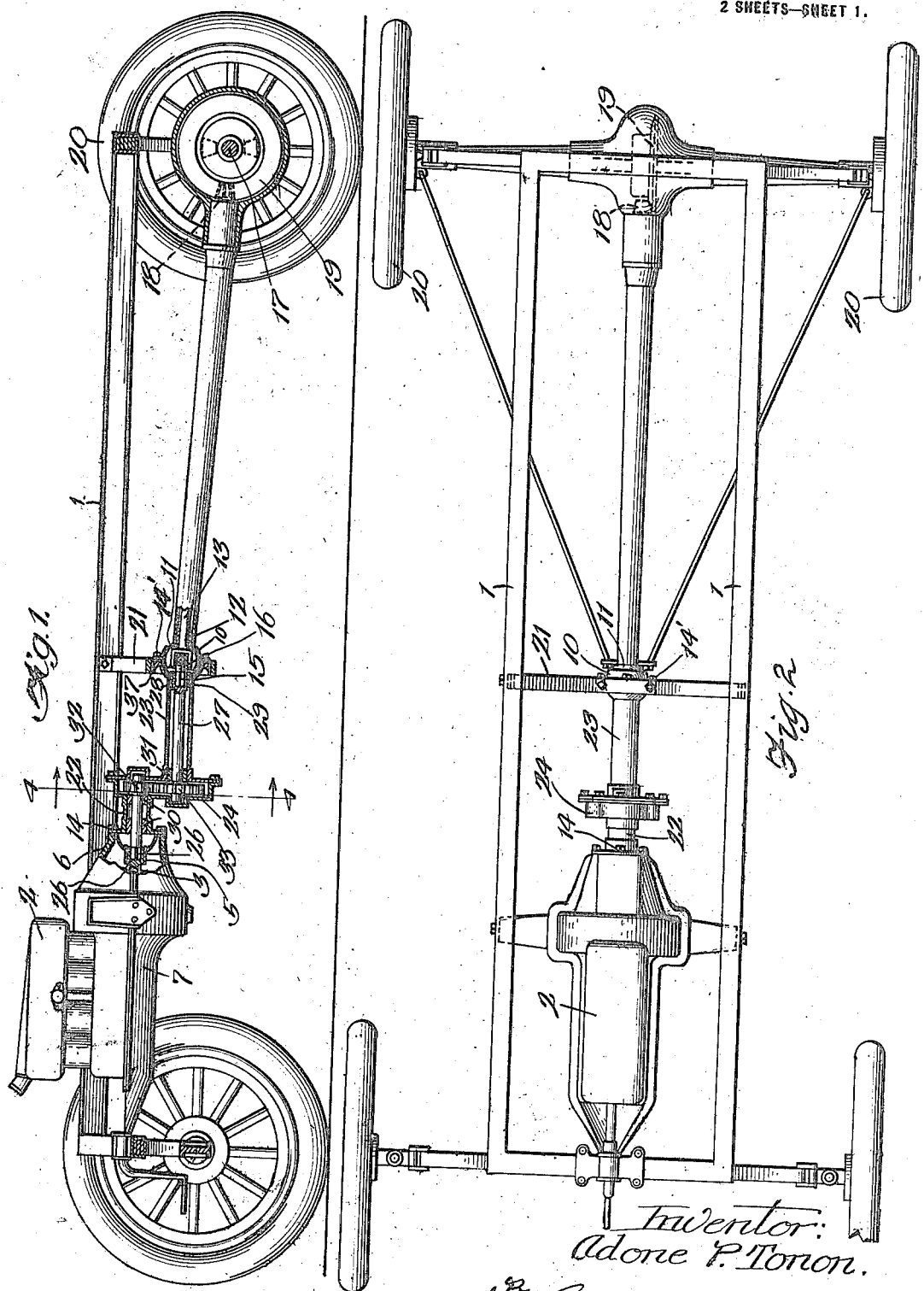
Inventor:
Adore P. Tonon.
By G. L. Gragg atty.

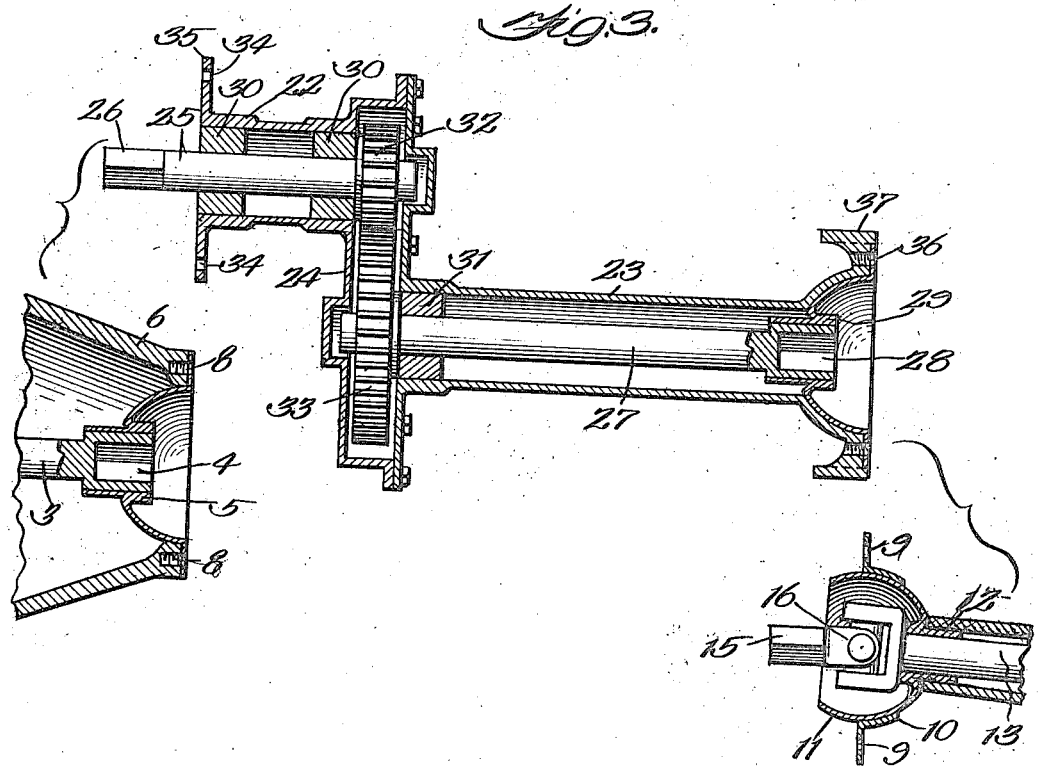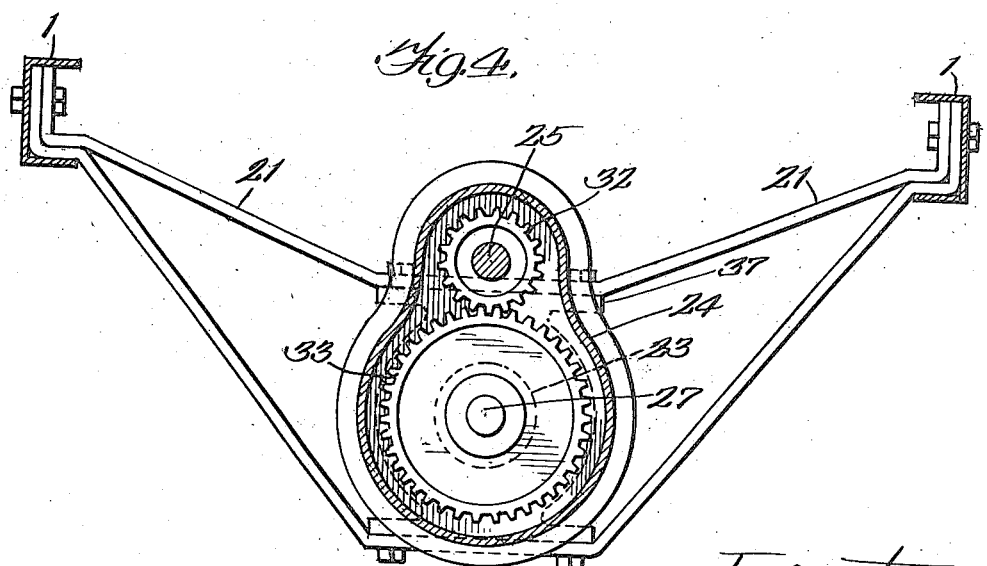

UNITED STATES PATENT OFFICE.

ADONE P. TONON, OF CHICAGO, ILLINOIS, ASSIGNOR TO CHARLES W. GILLETT, OF CHICAGO, ILLINOIS.

AUTOMOBILE.

1,239,643.  Specification of Letters Patent.  Patented Sept. 11, 1917.

Application filed November 13, 1916. Serial No. 131,132.

*To all whom it may concern:*

Be it known that I, ADONE P. TONON, a subject of the King of Italy, residing at Chicago, in the county of Cook and State of Illinois, have invented a certain new and useful Improvement in Automobiles, of which the following is a full, clear, concise, and exact description, reference being had to the accompanying drawings, forming a part of this specification.

This invention relates to automobiles, and particularly to automobiles which are to be converted from light pleasure cars of rapid speed into cars capable of carrying a greater load either of freight or passengers at a slower speed and correspondingly increased power.

The object of the invention is to provide means for lengthening the wheel base of an automobile and increasing the power of the car while reducing its speed, in which a minimum amount of change in the parts of the standard car is required.

My co-pending application Serial No. 111,551, filed July 27, 1916, discloses a structure having the same general purpose as the invention of my present application and claims are included in my said co-pending application which are intended broadly to cover the inventions disclosed in both applications.

An automobile constructed in accordance with my present invention includes a motor at its forward end having a shaft extending longitudinally of the automobile and which shaft is provided with a coupling member upon its rear end, a housing for said coupling, a second housing comprising a longitudinally extending front portion attached at its forward end to the rear end of the aforesaid housing, a longitudinally extending rear portion and a third portion extending transversely of the automobile and uniting the rear end of said front housing portion with the forward end of said rear housing portion, a second shaft which is in said front housing portion and provided with a coupling member upon its front end that is engaged with the coupling member upon the rear end of the motor shaft, a third shaft which is in said rear housing portion and which shaft is provided with a coupling member upon its rear end, bearings carried by the second housing for the shafts that are in the front and rear portions of the second housing, speed reduction and power increasing gearing inclosed by the third and transversely extending portion of the second housing and which gearing unites the shafts within the second housing, longitudinal shafting in power connection with the rear wheels of the automobile and provided with a coupling member upon its front end that is engaged with the coupling member upon the rear end of the third shaft, and a housing for said longitudinal shafting and whose front end is connected with the rear end of the housing for said third shaft.

Referring to the drawings, Figure 1 is a side view, partially in section, illustrating the preferred form of the invention, parts of the automobile which are not necessary to an understanding of the invention being omitted; Fig. 2 is a plan view of the structure shown in Fig. 1; Fig. 3 is a view illustrating parts that are shown assembled in Figs. 1 and 2 in separated relation; and Fig. 4 is a view on line 4 4 of Fig. 1.

Like parts are indicated by similar characters of reference throughout the different figures.

As the invention is of particular service in converting lower powered higher speed automobiles into higher powered lower speed automobiles or trucks, it may be inferred that the frame 1 is employed in place of the original frame which is shorter but otherwise similar to the frame illustrated. The drawings show parts of one well known type of automobile, but to which the invention is not to be limited, such an automobile including a motor 2 (preferably a hydrocarbon engine) which is located at the forward end of the automobile and which has a shaft 3 extending longitudinally of the automobile and which shaft is provided with a coupling member 4 upon its rear end, this coupling member being desirably in the form of an enlargement upon the rear end of the shaft that has a square socket. The exterior surface of the coupling member 4 is cylindrical so as to operate in a bearing 5 that is carried at the rear end of a housing 6 that surrounds the coupling member and also desirably constitutes a continuation of the engine crank case 7. This housing is provided with tapped holes 8 which, in the original automobile, were alined with holes 9 in a bearing socket 10 for the partially spherical housing section 11 constituting a continuation of the tubular housing 12 surrounding the shaft 13, threaded bolts 14 having previously been passed through the holes 9 into the tapped holes 8 in the original automobile but being employed, in the transformed automobile, to unite another housing portion with the housing portion 6, as will appear. In the original automobile the square socket 4 received the square stub shaft 15 flexibly coupled with the shaft 13 by means of the universal joint 16. In the present form of my invention the shafting 13—15 maintains its original power connection with the rear shaft 17 through the intermediation of gearing 18 in driving relation with the differential gear 19 coupling the sections of the shafting 17. The wheels 20 are coupled with the outer ends of the shaft 17 and may be the original rear propelling wheels or substituted wheels of larger size. The shafting 13—15 is suspended at its forward end from the frame 1 by a hanger 21. In accordance with my present invention a second housing is employed which comprises a longitudinally extending front portion 22, a longitudinally extending rear portion 23 and a third portion 24 which extends transversely of the automobile and unites the rear end of said front housing portion with the forward end of said rear housing portion. A shaft 25 is mounted in the front housing portion 22 which shaft is provided with a square coupling member 26 upon its front end that is engaged within the coupling member 4 upon the rear end of the motor shaft 3. Another shaft 27 is in the rear housing portion 23, this shaft being provided with a coupling member 28 upon its rear end, this coupling member being desirably in the form of an enlargement upon the rear end of the shaft that has a square socket. The exterior surface of the coupling member 28 is cylindrical so as to operate in a bearing 29 that is carried at the rear end of the housing 23 that surrounds the coupling member 28. Bearings 30 are provided in the forward housing section 22 for the shaft 25 and a bearing 31 is provided in the forward end of the housing section 23 that supplements the bearing 29 at the rear of this latter housing section in supporting the shaft 27. A spur pinion 32 is upon the rear end of the shaft 25 and a much larger spur pinion 33 is upon the forward end of the shaft 27, the transverse housing section 24 accommodating the speed reducing and power increasing gearing 32, 33.

When the automobile is to be transformed into one having a longer wheel base and more power with less speed the frame 1 is substituted for the original frame, as hitherto stated, and the speed reducing and power increasing unit comprising the shafts 25, 27, the speed reducing and power increasing gearing 32, 33, and the housing and bearings for these elements, is interposed between the bearing 9 and the housing 6, the bolts 14 being passed through the openings 34 in the flange 35 upon the forward end of housing section 22, these bolts being passed into the threaded openings 8. Other bolts 14¹ (which may be identical with the bolts 14 and interchangeable therewith) are passed through the openings 9 in the bearing 10 into the threaded openings 36 in the flange 37 upon the rear end of the housing section 23. The unit thus bodily inserted between the elements 10 and 6 previously directly bolted together serve, in conjunction with the longer frame 1, to lengthen the wheel base of the automobile and to increase the power by which the engine 2 operates the propelling shaft 17.

The novel feature of my invention resides in the compact unit thus bodily inserted between the bearing 10 and the continuation 6 of the engine case or housing and renders the transmission of a high speed lower powered automobile into a higher powered lower speed automobile or truck.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

An automobile including a motor at its forward end having a shaft extending longitudinally of the automobile and which shaft is provided with a coupling member upon its rear end; a housing for said coupling; a second housing comprising a longitudinally extending front portion attached at its forward end to the rear end of the aforesaid housing, a longitudinally extending rear portion and a third portion extending transversely of the automobile and uniting the rear end of said front housing portion with the forward end of said rear housing portion; a second shaft which is in said front housing portion and provided with a coupling member upon its front end that is engaged with the coupling member upon the rear end of the motor shaft; a third shaft which is in said rear housing portion and which shaft is provided with a coupling member upon its rear end; bearings carried by the second housing for the shafts that are in the front and rear portions of the second housing; speed reduction and power increasing gearing inclosed by the third and transversely extending portion of the second housing and which gearing unites the shafts within the second housing; longitudinal shafting in power connection with the rear wheels of the automobile and provided with a coupling member upon its front end that is engaged with the coupling member upon the rear end of the third shaft; and a housing for said longitudinal shafting and whose front end is connected with the rear end of the housing for said third shaft.

In witness whereof, I hereunto subscribe my name this 19th day of September, A. D. 1916.

ADONE P. TONON.

Witnesses:
G. L. CRAGG,
ETTA L. WHITE.